March 8, 1932.  G. F. COUCH  1,849,040

ROLLER BEARING

Filed April 25, 1928

Inventor

Glenn F. Couch

By [signature]

his Attorney

Patented Mar. 8, 1932

1,849,040

UNITED STATES PATENT OFFICE

GLENN F. COUCH, OF ROCHESTER, NEW YORK, ASSIGNOR TO THE SYMINGTON COMPANY, OF NEW YORK, N. Y., A CORPORATION OF MARYLAND

ROLLER BEARING

Application filed April 25, 1928. Serial No. 272,810.

This invention relates to roller bearings and more particularly to a roller bearing assembly in which resilient means is provided between the inner raceway and the associated journal for absorbing shocks transmitted from said journal to the associated parts.

The principal object of my invention, generally considered, is to provide a roller bearing in which resilient means is provided, preferably disposed between the inner roller raceway and the associated journal for absorbing shocks received by the journal, and thereby preventing the transmission thereof to some extent to the associated raceways and rollers, whereby breakage, strains and crystallization of the metal parts is minimized.

Another object of my invention is to provide a roller bearing involving outer and inner raceways with rollers therebetween and resilient means disposed between the inner raceway and associated journal for absorbing some of the shocks transmitted from the journal to the associated rolling elements.

A further object of my invention is to provide a roller bearing journal box and an associated roller bearing assembly in which the housing for the roller bearing proper is adapted to rock transversely on the journal box for equalizing the journal pressure and in which the journal is retained in place by a thrust nut attached to the end thereof, the transmission of shocks from the journal to the associated rolling parts being minimized by the provision of resilient means preferably in the form of hardwood strips between the inner raceway and the associated journal.

Other objects and advantages of the invention relating to the particular arrangement and construction of the various parts will become apparent as the description proceeds.

Referring to the drawings illustrating my invention, the scope whereof is defined by the appended claims:

Figure 1:
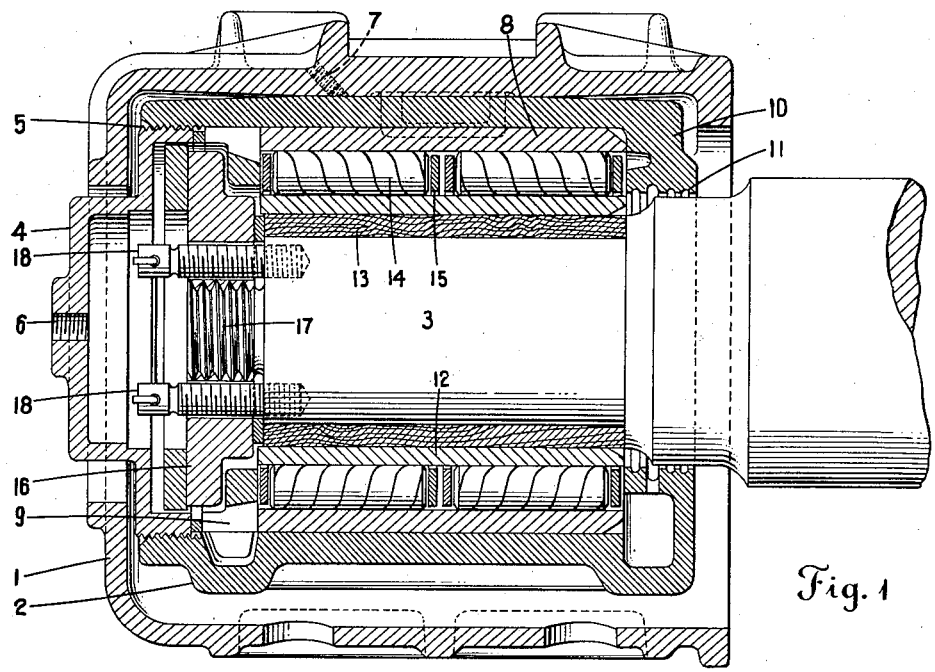
Figure 1 is a vertical longitudinal section of a journal box and associated roller bearing assembly embodying my invention, the associated journal being shown in elevation.
Figure 2:
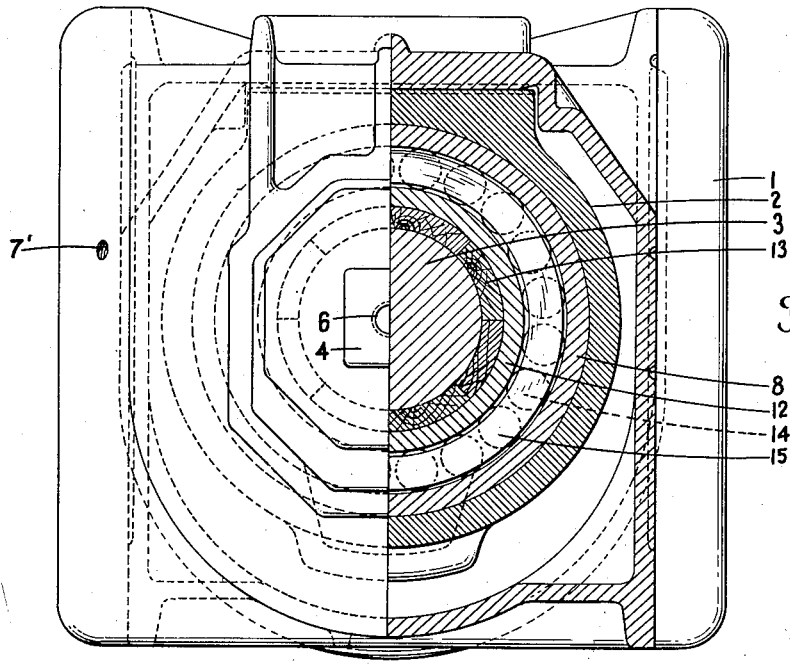
Figure 2 is a partial transverse section and partial end elevation of the embodiment of my invention illustrated in Figure 1.

Referring to the drawings in detail, like parts being designated by like reference characters, a journal box 1 is illustrated which is adapted to receive a casing or housing 2 for an associated roller bearing assembly. The undersurface of the roof of the box or the top surface of the housing, or both, is crowned or convexly curved to permit transverse rocking of the housing with respect to the box for permitting equalization of the associated journal 3 with respect thereto. The inner wall of the housing 2 is apertured for receiving the journal 3 and the outer wall thereof is apertured for receiving an outer cover 4 desirably threaded thereto, as indicated at 5. The outer wall of said cover 4 is desirably tapped, as indicated at 6, for receiving an alemite or other fitting for lubricating purposes. The roof and sides of the box 1, as indicated at 7 and 7', respectively, may likewise be adapted for lubricating fittings.

Mounted in the housing 2 is an outer raceway 8 preferably forming a push fit in the bore of said housing. For securely holding said raceway in the housing a bronze thrust plate 9 is desirably provided and driven in place to engage the outer end of said raceway.

The journal 3 extends into the journal box 1 through the inner wall thereof and through the inner wall 10 in the housing 2, grease grooves 11 being desirably provided on the edges of the opening in the housing receiving said journal for minimizing the loss of grease or other lubricant. Mounted on the journal 3 in the housing 2 is an inner raceway 12 which is preferably shrunk on the journal with resilient means 13 between said journal and raceway. Said resilient means desirably takes the form of hardwood strips or material having equivalent resilient properties, and it will be understood that the journal may be encircled by said strips and the raceway heated and applied therearound so that upon cooling the raceway and strips are firmly attached to the journal 3.

Between the outer surface of the inner raceway 12 and the inner surface of the outer raceway 8 are rollers or other anti-friction means 14 of any usual or desired character held in place by any desired form of spacing rings 15. In order to hold the journal in assembled relation with respect to the roller bearing assembly, a thrust nut 16 serving to limit endwise relative movement of the journal, is desirably connected to the end of said journal by threadably engaging an extension 17 thereon and afterwards being locked in place by a plurality or pair of set screws 18. A washer, as illustrated, may be disposed between the outer ends of the resilient strips 13 and the inner face of the nut 16 to tightly engage said strips when the nut 16 is placed in position and thereby assist in securing them in place. The mode of assembling the roller bearing will be clear to those skilled in the art without further explanation. It will also be understood that the bearing may be lubricated by oil or grease in accordance with standard practice.

From the foregoing it will be apparent that I have devised a roller bearing in which resilient means are provided between the inner raceway and associated journal for absorbing shocks which may be transmitted through the wheels and axle to said journal and on account of such shock absorption the strain imposed on the associated rolling parts is minimized, whereby breakage, undue strain or crystallization of the metal parts is avoided. Although the filler ring employed between the inner raceway and the journal is preferably of hardwood strips, I do not wish to be limited to this showing as other material having resilient properties comparable with those of wood may be employed within the scope and spirit of my invention.

Having thus described my invention, I claim:

1. A roller bearing journal box formed to receive a roller bearing assembly adapted to rock laterally with respect thereto, said assembly comprising a casing, an outer raceway firmly held in the casing, a journal extending into said box and casing, an inner raceway mounted on said journal with resilient means disposed therebetween, and rollers positioned between said outer and inner raceways.

2. A roller bearing journal box assembly comprising a journal box, a roller bearing assembly casing therein adapted to rock laterally with respect thereto, an outer raceway firmly held in said casing, a journal extending into said box and casing, an inner raceway mounted on said journal, a wood filler disposed therebetween, and rollers positioned between said outer and inner raceways.

In testimony whereof I affix my signature

GLENN F. COUCH.